(No Model.)
W. N. HOWDEN.
ANIMAL RELEASING DEVICE.
No. 385,671. Patented July 3, 1888.
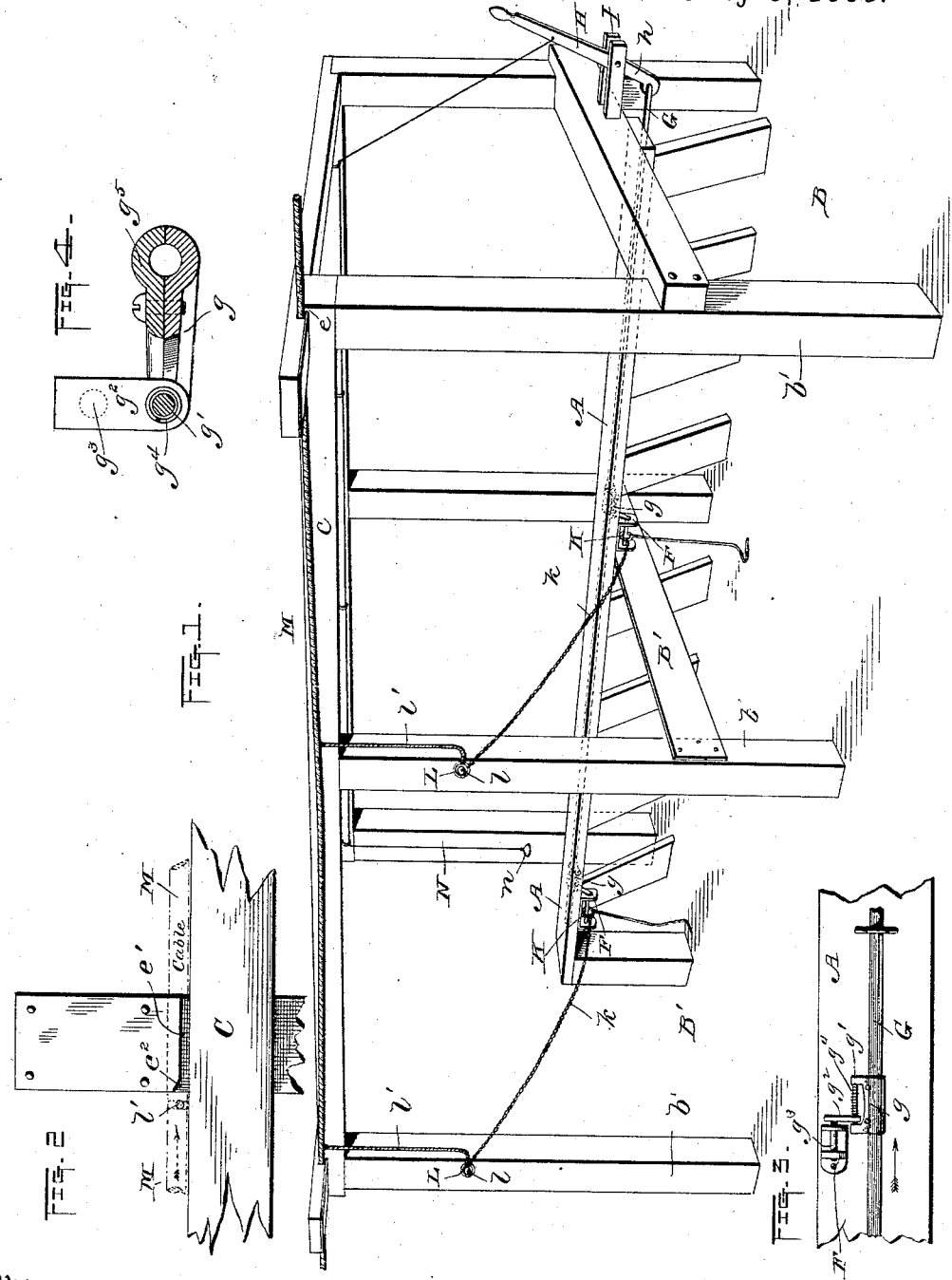
Witnesses
G. G. Conner, Jr.
R. B. Seward.
Inventor.
Wm. N. Howden.
By James E. Young and
E. C. Seward,
Attorneys

UNITED STATES PATENT OFFICE.

WILLIAM N. HOWDEN, OF LAWRENCE, KANSAS, ASSIGNOR OF ONE-THIRD TO JOHN McNAUGHTON.

ANIMAL-RELEASING DEVICE.

SPECIFICATION forming part of Letters Patent No. 385,671, dated July 3, 1888.

Application filed December 21, 1887. Serial No. 258,611. (No model.)

*To all whom it may concern:*

Be it known that I, WILLIAM N. HOWDEN, a citizen of the United States, residing at Lawrence, in the county of Douglas and State of Kansas, have invented certain new and useful Improvements in Animal-Releasing Devices; and I do hereby declare the following to be a full, clear, and exact description of the invention, such as will enable others skilled in the art to which it appertains to make and use the same.

My invention relates to an improvement in releasing devices.

It sometimes happens that fire breaks out in the loft of a stable, and because of the direction of the wind prevailing at the time prevents access to the door or operating device at the end of the stable where it is located; and many of the releasing devices at present in use are liable to become entangled with the feet of the animals, causing some of them to fall, and thereby prevent others attached to the same leader from escape.

The object of my present invention is to provide a releasing device which may be operated from either end of the stable or series of stalls, and which will admit of the animals being led out at either end.

A further object is to provide a releasing device applicable to stalls of ordinary construction separated by permanent partitions, which will effectually avoid the liability of entangling the feet of the animals.

A further object is to provide a simple and convenient hitching device by which one horse may be released without releasing others.

A further object is to provide a simple and inexpensive device which may be operated by unskilled as well as by skilled persons.

With these ends in view my invention consists in certain features of construction and combinations of parts, as will be hereinafter described, and pointed out in the claims.

In the accompanying drawings, Figure 1 is a view of two consecutive stalls, showing the releasing device in position for use. Fig. 2 is a bottom plan view of one of the leading-cable supports. Fig. 3 is a detail bottom view of the releasing and hitching device, and Fig. 4 is a transverse section of a portion of said hitching device.

A represents a beam running along the upper edge of the manger on the side on which the animals are supposed to stand.

B represents one end of the stable, B' B' the partitions between the stalls, and $b$ $b'$ $b'$ the uprights at the rear ends of the stalls. The said uprights may be either framed into or secured to the joist overhead or to a stringer, C, as may be found convenient.

A pair of perforated ears or lugs, F, are secured to the under side of the beam A at points near the partition B', and a longitudinally-sliding rod, G, with a bracket-plate, $g$, one for each stall, is secured to the under side of the beam A in such position that the plate $g$ will occupy a position when the parts are in locked adjustment with its end in proximity to the lug F, as shown. The free end of the plate is perforated to receive a bolt, $g'$, on which a short laterally extending bar or plate, $g^2$, is loosely mounted, the said bar $g^2$ being provided with a rod or pin, $g^3$, adapted to extend through the perforations in the ears or lugs F with a loose fit. To hold the bar $g^2$, which is essentially nothing more than the laterally-projected head of the pin $g^3$, normally in position to keep the pin seated in the lugs F, a coil-spring, $g^4$, is placed on the bolt $g'$ between the bar $g^2$ and an abutment on the plate $g$, as shown. The plates are secured to the releasing-rod by means of a removable half-section, $g^5$, adapted to be screwed or bolted to the main portion. This renders them readily adjustable on the rod. One end of the rod G projects through the end of the stable and is attached to the short arm $h$ of the operating-lever H, the latter being suitably pivoted to a support, I, at the end of the stable.

K represents the combined hitching and releasing rings, which are normally secured on the pins $g^3$ between the ears or lugs F. To these rings the halters are attached, and from the said rings small chains or cords $k$, preferably of some fire-proof material, extend to other rings, L, which are intended to be normally supported on taper pins $l$ or other suitable supports on the uprights $b'$ at the rear ends of the partitions. The rings L are also connected with a cable, M, preferably a small wire cable, which extends along the beam above the passage-way.

The cable M is supported in bearings $e$, having slots $e'$ extending along their lower sides from end to end and provided with flaring or funnel-shaped mouths $e^2$ toward the interior of the stable. The connections $l'$ between the rings L and the cable M are of less diameter than the cable itself, and the slots $e'$ are intended to admit of the free passage of the connections $l'$, but are not wide enough to allow the cable to fall through. The flaring mouths of the slots serve to direct the connections $l'$ into the slots and prevent any tendency to bind or catch when the cable, with its connections, is drawn lengthwise through its bearings.

The rings L, seated on the pins $l$, serve to relieve the cable from the weight of the connections between the rings L and the rings K, and keep the said connections snugly out of the way. The pins may be tapered downwardly and on each side, and the connections $k$ may be of such length that the rings L will be held in position on the pin so long as the rings K are in locked adjustment on the plates $g$; but when the latter are released and the cable M draws on the rings L the latter will, without fail, readily slip off. The above is one of several simple arrangements for securing the rings L in removable adjustment to the uprights.

The cable M is intended to extend outside of the stable at each end and be within easy reach of an operator, and it is further found desirable to have a sufficient length of cable project from each end to hold the several connections up from the floor until the animals shall have been led into the passage and the last one shall have reached a point near the doorway.

It is evident that by throwing the long arm of the lever H toward the end of the stable the several pins $g^3$ on the plate will be withdrawn from the rings K and the latter set free. In order to operate the lever from the opposite end of the stable, a fire-proof cord or wire, N, is attached to the long arm of the lever, and is led thence along the front or top of the stable to the opposite end, where it terminates in a loop, $n$. By pulling on the said loop the lever H will be operated to release the rings K in the same manner as from the opposite side of the stable.

The operation is as follows: By operating the lever H from either end of the stable the rings K will be simultaneously released and the animals free to be led out of the stable. By grasping the cable M and drawing it lengthwise in its bearings the several rings L will be detached from their supports and the animals will be led into the passage-way and out through the doorway, where the operator is at work. As the cable slides along in its bearings the connection $l'$ will pass through the slots $e'$, being guided therein by the funnel-shaped mouths $e^2$. Furthermore, when it is desired to release any one of the horses for use or other purposes without releasing the others, the pin $g^3$ may be pressed out of the lugs F against the tension of the spring $g^4$ until the ring K is released without disturbing in any respect the rod G. The bar or pin head $g^2$, loosely mounted on the bolt $g'$, renders the device capable of ready adjustment to suit any slight variations in the surface of the pin and affords a convenient hold for the fingers in releasing the pin.

By the above construction the releasing device may be operated from either end of the stable, the animals led out from either end, and the device is composed of few parts, is inexpensive, and may be readily applied to stables of ordinary construction with but little or no material change in their construction.

Having thus fully described my invention, what I claim as new, and desire to secure by Letters Patent, is—

1. The combination, with the releasing-rod, a lever at one end of the stable to operate the rod, and a connection leading from the handle of the lever to the opposite end of the stable for operating the lever, of the hitching-rings, a cable permanently supported along a passage at the rear end of the stalls, the said cable terminating at each end of the stable in a free end and having a free longitudinal movement in either of two opposite directions, and connections leading from the cable to the several hitching-rings, whereby the animals may be released and led out from either end of the stable, substantially as set forth.

2. The combination, with the releasing-rod, a plate provided with a removable half section, whereby it may be adjusted on the rod in any desired position, a bolt secured to the plate, a pin having its head loosely mounted on the bolt, and a spring on the bolt between the head of the pin and a portion of the plate, of a pair of perforated lugs secured in position to receive the pin, substantially as set forth.

3. The combination, with the hitching-rings, means for releasing them, a cable permanently supported along a passage-way, and connections between the cable and the hitching-rings, of cable-bearings provided with open slots along their under faces, whereby the connections are allowed a free passage as the cable is moved lengthwise, substantially as set forth.

4. The combination, with the hitching-rings, means for releasing them, a cable permanently supported along the passage-way, and connections between the cable and the hitching-rings, of cable-bearings provided with flaring-mouthed slots along their under faces for receiving and guiding the connections, substantially as set forth.

In testimony whereof I have affixed my signature in presence of two witnesses.

WILLIAM N. HOWDEN.

Witnesses:
S. K. FARR,
BESSIE E. YOUNG.